United States Patent
Nitsche et al.

(10) Patent No.: US 10,279,677 B2
(45) Date of Patent: May 7, 2019

(54) MOTOR VEHICLE UNDERTRAY TRIM PANEL HAVING AN AIR INLET

(71) Applicant: Ford Global Technologies, LLC, Dearborn, MI (US)

(72) Inventors: Thomas Nitsche, Neuss (DE); Alberto Fontana, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/712,596

(22) Filed: Sep. 22, 2017

(65) Prior Publication Data
US 2018/0093560 A1  Apr. 5, 2018

(30) Foreign Application Priority Data

Sep. 30, 2016  (DE) .................. 10 2016 219 035

(51) Int. Cl.
*B60K 11/08* (2006.01)
*B62D 35/02* (2006.01)

(52) U.S. Cl.
CPC .............. *B60K 11/08* (2013.01); *B62D 35/02* (2013.01); *Y02T 10/82* (2013.01); *Y02T 10/88* (2013.01)

(58) Field of Classification Search
CPC ........ B60K 13/02; B60K 13/06; B60K 11/06; B60K 11/08; B62D 35/02
USPC ................................. 296/208; 180/68.1, 68.3
See application file for complete search history.

(56) References Cited

U.S. PATENT DOCUMENTS

| | | | | | |
|---|---|---|---|---|---|
| 2,913,065 A | * | 11/1959 | Lyon, Jr. | ................ | B60K 11/04 123/41.06 |
| 4,212,369 A | * | 7/1980 | Zeilinger | ................ | B60K 11/08 181/224 |
| 4,249,626 A | * | 2/1981 | Fields | ................ | F28D 1/05383 165/47 |
| 4,455,045 A | * | 6/1984 | Wheeler | ................ | B62D 35/00 105/1.2 |
| 4,681,178 A | * | 7/1987 | Brown | ................ | B60K 13/02 180/68.3 |

(Continued)

FOREIGN PATENT DOCUMENTS

DE          4102073 A1     7/1992
DE         19952782 A1     5/2001
(Continued)

*Primary Examiner* — Jeffrey J Restifo
(74) *Attorney, Agent, or Firm* — Vichit Chea; Price Heneveld LLP

(57) ABSTRACT

A motor vehicle undertray trim panel having an air inlet delimited toward the vehicle and toward the roadway by upper and lower flat elements, respectively, which extend arcuately rearward and upward in the direction of a vehicle engine compartment for air flow cooling. The rear end of the upper flat element is adjoined by a planar air ram plate which runs by a small amount substantially vertically upward, and ends substantially freely in the engine compartment. The air inlet contains eddy producing structures. The structures may be a plurality of air guiding plates which extend along the vehicle vertical axis and the vehicle longitudinal direction in the air inlet and which are curved transversely such that the overall flow cross section in the vehicle longitudinal direction is substantially constant, or a plurality of small air inlets which are integrated into the air inlet.

16 Claims, 1 Drawing Sheet

(56) References Cited

U.S. PATENT DOCUMENTS

| | | | | |
|---|---|---|---|---|
| 4,805,747 A * | 2/1989 | Moedinger | F16D 65/847 | 188/264 A |
| 4,810,021 A * | 3/1989 | Burst | B60T 5/00 | 296/180.1 |
| 5,322,340 A * | 6/1994 | Sato | B62D 25/20 | 180/68.1 |
| 5,513,893 A * | 5/1996 | Nakata | B62D 35/02 | 180/68.2 |
| 5,526,872 A * | 6/1996 | Gielda | B60K 11/02 | 123/41.49 |
| 5,863,090 A * | 1/1999 | Englar | B62D 35/00 | 296/180.1 |
| 6,260,911 B1 * | 7/2001 | Becker | B62D 35/005 | 180/903 |
| 6,485,093 B2 * | 11/2002 | Reivers | B60J 7/22 | 296/180.1 |
| 6,854,544 B2 * | 2/2005 | Vide | B60K 11/085 | 180/68.1 |
| 7,163,073 B2 * | 1/2007 | Schmid | B60K 11/08 | 180/68.1 |
| 7,198,139 B2 * | 4/2007 | Wilson | F16D 65/78 | 188/264 AA |
| 7,854,469 B2 * | 12/2010 | Dayton | B62D 35/001 | 296/180.1 |
| 7,886,859 B2 * | 2/2011 | Caldirola | B60K 11/08 | 123/41.59 |
| 8,528,601 B2 * | 9/2013 | Dahm | B64C 21/10 | 137/809 |
| 8,544,583 B2 * | 10/2013 | Ajisaka | B60K 11/08 | 180/68.1 |
| 8,550,787 B2 * | 10/2013 | Fuglsang | F03D 1/0675 | 415/914 |
| 8,579,594 B2 * | 11/2013 | Fuglsang | F01D 5/145 | 416/231 R |
| 8,708,075 B2 * | 4/2014 | Maurer | B60R 19/52 | 180/68.1 |
| 8,752,660 B2 * | 6/2014 | Ajisaka | B60K 11/04 | 180/291 |
| 9,429,071 B2 * | 8/2016 | Quackenbush | F02C 7/04 | |
| 9,440,555 B2 * | 9/2016 | Garfinkel | B60L 11/1874 | |
| 9,738,331 B2 * | 8/2017 | Ito | B62D 35/02 | |
| 9,957,000 B1 * | 5/2018 | Ehirim | B62D 35/02 | |
| 10,053,163 B1 * | 8/2018 | Del Gaizo | B62D 37/02 | |
| 10,189,348 B2 * | 1/2019 | Wendelmuth | B60K 11/08 | |
| 2010/0044522 A1 * | 2/2010 | Siercke | B60H 1/26 | 244/53 B |
| 2011/0284298 A1 * | 11/2011 | Ajisaka | B60H 1/00535 | 180/65.21 |
| 2012/0024611 A1 * | 2/2012 | Ajisaka | B60K 11/08 | 180/68.1 |
| 2012/0153681 A1 * | 6/2012 | Ajisaka | B60K 11/04 | 296/208 |
| 2013/0059519 A1 * | 3/2013 | Tajima | B60K 11/04 | 454/152 |
| 2013/0106135 A1 * | 5/2013 | Praskovsky | B62D 35/001 | 296/180.1 |
| 2014/0251241 A1 * | 9/2014 | Tajima | B60K 11/04 | 123/41.56 |

FOREIGN PATENT DOCUMENTS

| | | |
|---|---|---|
| DE | 102012001459 A1 | 7/2013 |
| DE | 102012205582 A1 | 10/2013 |
| JP | 04356225 A | 12/1992 |

* cited by examiner

MOTOR VEHICLE UNDERTRAY TRIM PANEL HAVING AN AIR INLET

FIELD OF THE INVENTION

The present invention generally relates to a motor vehicle undertray trim panel, and more particularly relates to an undertray trim panel having an air inlet which is delimited toward the vehicle engine compartment and toward the roadway to cool components of the vehicle.

BACKGROUND OF THE INVENTION

An undertray trim panel configured as a diffuser in the rear region of a motor vehicle is generally disclosed in DE 10 2012 205 582 A1. Included is a lower flat element formed by way of a trim panel of the rear bumper and not ending freely, but rather curving forward in an arc. In motor vehicles having an internal combustion engine, for example in the front region, components can be situated in the engine compartment in front of, to the side of and, in particular, behind the internal combustion engine, which components are to be flowed around by cool air, in order to be cooled in an optimum manner. The air should be cooler than the air which tends to be warmer and has flowed through the front radiator and the associated fan and then flows through the remaining engine compartment, it being possible, however, for the latter air to be cool enough for other components, in particular those which lie closer to the engine. In general, however, the flat efficient submerged air intake device (FESAD) air inlet can also serve for other types of air supply for units or components, not only for cooling purposes.

In order to cool components with fresh air that lie behind the internal combustion engine, heat up during operation and must not become too hot, what is known as a NACA air inlet can be provided. The air inlet supplies air flow in the undertray trim panel and typically extends below the oil sump of the engine and opens into the space which lies behind the engine. A NACA air inlet usually requires certain minimum dimensions, however, in particular a certain length and height in relation to the vehicle longitudinal direction, in order to operate efficiently, and its lowermost part typically must be at a legally prescribed minimum spacing from the roadway. Therefore, a NACA air inlet typically restricts the packaging space available above it in the engine compartment.

Although the NACA air inlet in the abovementioned document DE 10 2012 205 582 A1 has a relatively low overall height, it is generally sufficient here because typically only a component which lies directly above it is to be cooled, namely a rear muffler which is additionally arranged in a housing, through which the supplied fresh air flows. In order that air flow can also pass satisfactorily onto components which lie further to the top in an engine compartment, the NACA air inlet would also have to reach as far as there, since otherwise a premature split of the cool air flow would take place, in particular as a result of the warmer air which circulates in the engine compartment and has flowed through the front radiator and the associated fan. Owing to its construction, the NACA air inlet commonly has a linearly obliquely running ramp with a correspondingly relatively large overall height.

It would be desirable to provide a motor vehicle undertray trim panel having an air inlet in such a way that the available packaging space in the engine compartment is increased both in the vertical and in the horizontal directions, and, moreover, with the result that components which lie in front of, to the side of or behind the internal combustion engine are supplied with cooling fresh air in an optimum manner. It would be desirable that this function be ensured in a manner which is as neutral as possible with regard to harmful resistances, such as vehicle air resistance.

SUMMARY OF THE INVENTION

According to one aspect of the present invention, a motor vehicle undertray trim panel is provided. The motor vehicle undertray trim panel includes having an air inlet which is delimited toward the vehicle and toward the roadway by way of an upper and a lower flat element, respectively, which flat elements extend arcuately rearward and upward in a direction of a vehicle engine compartment space, wherein a rear end of the upper flat element is adjoined by a planar air ram plate which is directed substantially vertically upward and ends substantially freely in the engine compartment, and wherein the air inlet contains eddy producing structures, the eddy producing structures either being a plurality of air guiding plates which extend along a vehicle vertical axis and a vehicle longitudinal direction in the air inlet and which are curved transversely such that an overall flow cross section in the vehicle longitudinal direction is substantially constant, or being a plurality of small air inlets which are integrated into the air inlet.

According to another aspect of the present invention, a motor vehicle undertray trim panel is provided. The motor vehicle undertray trim panel includes an air inlet having upper and lower flat elements directed toward an engine compartment and a roadway and extending arcuately rearward and upward towards the engine compartment, a planar air ram plate adjoining a rear end of the upper flat element and directed substantially vertically upward, ending substantially freely in the engine compartment, and eddy producing structures contained in the air inlet.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
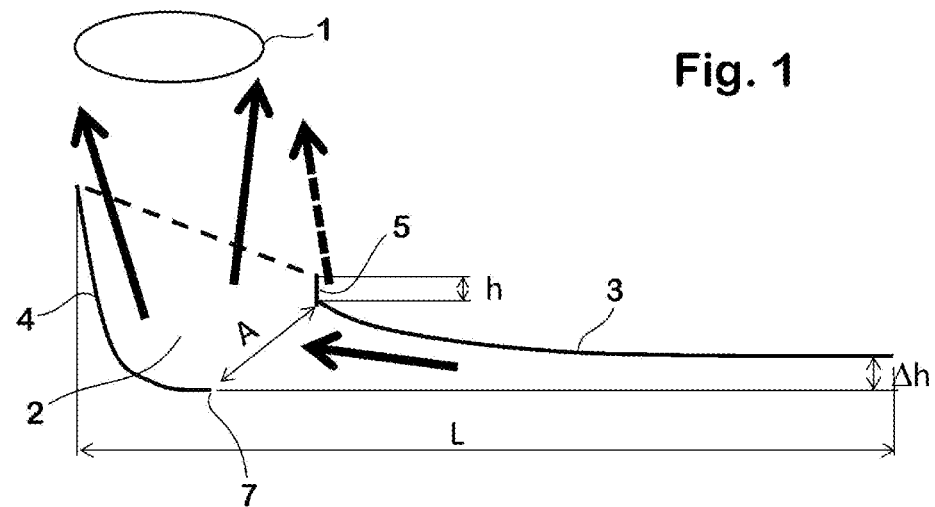
FIG. 1 is a diagrammatic longitudinal sectional view of an undertray trim panel having a FESAD air inlet for cooling components in the engine compartment of a motor vehicle.

FIG. 1 diagrammatically shows, by way of example in a longitudinal section through a motor vehicle, a section of an engine compartment which is situated at the front in the vehicle and in which there is an elliptically encircled region 1, in which one or more components of the vehicle or its drive are situated, which become warm during operation and require special cooling. As viewed in the vehicle longitudinal direction, the region 1 lies behind an internal combustion engine (not shown) which serves as the vehicle drive, according to one embodiment and is cooled by the undertray trim panel.

A FESAD air inlet 2 serves to cool the components in the region 1 of the engine compartment. Included is a duct which is configured in the undertray trim panel of the vehicle and is delimited toward the engine compartment and toward the engine or motor by an upper flat element 3 which begins below a front radiator (not shown) and toward the roadway forward of the vehicle by a lower flat element 4 and laterally by side walls. The flat elements 3 and 4 have substantially flat portions and extend in each case arcuately rearward and upward in the direction of the region 1. The flat elements 3 and 4 are delimited or directed towards the engine compartment and roadway to receive air at the front end and direct the air flow to the engine compartment for cooling.

During driving, relatively cool fresh air enters the undertray trim panel at the front and flows from the undertray trim panel into the region 1, as indicated by the continuous solid arrows. Moreover, there is a relatively warm air flow (indicated using a dashed arrow) above the upper flat element 3 from a fan of a front radiator below an oil sump of the internal combustion engine, the internal combustion engine being situated in the figure to the left of the dashed arrow and above the upper flat element 3.

Typically, in the case of a conventional design of the FESAD air inlet, both the upper flat element and the lower flat element would run or extend in continuously steeper arcs. In the case of a design of this conventional type, however, part of the warmer air which flows above the upper flat element would be directed into the region 1 to be cooled and would impede the fresh air flow through the air inlet 2.

In the case of the design of the undertray trim panel which is shown in FIG. 1 of the present disclosure, the rear end of the upper flat element 3 is adjoined by a planar air ram plate 5 which extends or runs by a small amount shown as height distance h in a substantially vertically upwardly directed manner and then ends substantially freely in the engine compartment. The height distance h is limited substantially merely by components which are situated in the installation space. As a result, the air inlet 2 has an air outlet area which is directed to the component(s) to be cooled and is indicated in FIG. 1 using dashed lines. The height distance h is to be designed at a maximum as a result of the conditions arising in the installation space, and the angle, by which the air outlet area of the FESAD air inlet is inclined with respect to the vehicle longitudinal direction, results from the installation space conditions and may be about 20 degrees in this example, with a variation of±10 degrees.

The short vertically bent-away air ram plate 5 has the effect that it tends to deflect the warmer air flow upward or to the side, with the result that the cooler and warmer air flows remain largely separated even behind the air ram plate 5, and the region 1 is loaded exclusively by the cooler air, as desired.

The described and shown design of the undertray trim panel advantageously makes it possible to make the vertical extent of the FESAD air inlet 2 smaller than in the case of a conventionally designed NACA air inlet, with the result that space is saved in the engine compartment, in particular in the region above the upper flat element 3.

As can be seen from FIG. 1, an opening cross section, effective in the vertical direction, of the air inlet 2 is determined, by the front width of the air inlet 2, by a dimension $\Delta h$, by which a front and lower end 7 of the lower flat element 4 or a rubber lip which is optionally attached to it lies lower than the front and lower end of the upper flat element 3. The dimension $\Delta h$ can be, for example, in a range from a few millimeters to 10 centimeters, the minimum dimension being dependent on the desired air throughput.

A diagonal opening cross section of the air inlet 2 is determined by the spacing A between the front and lower end 7 of the lower flat element 4 and the connecting point between the upper flat element 3 and the air ram plate 5. The air inlet 2 has an overall length L.

Figure 2:
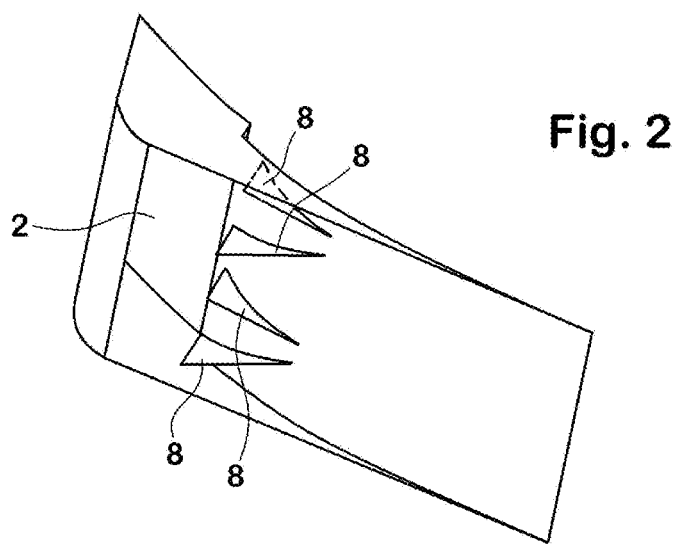
FIG. 2 is a diagrammatic perspective view of a first embodiment of the undertray trim panel having the FESAD air inlet shown in FIG. 1.

As illustrated in FIG. 2 in a diagrammatic perspective view, a plurality of arcuate air guiding plates 8 can be arranged on the undertray trim panel in the air inlet 2, according to one embodiment. The air guiding plates 8 extend in each case along the vehicle vertical axis and the vehicle longitudinal direction in the air inlet and are curved transversely with respect thereto in such a way that the overall flow cross section in the vehicle longitudinal direction is substantially constant.

Figure 3:
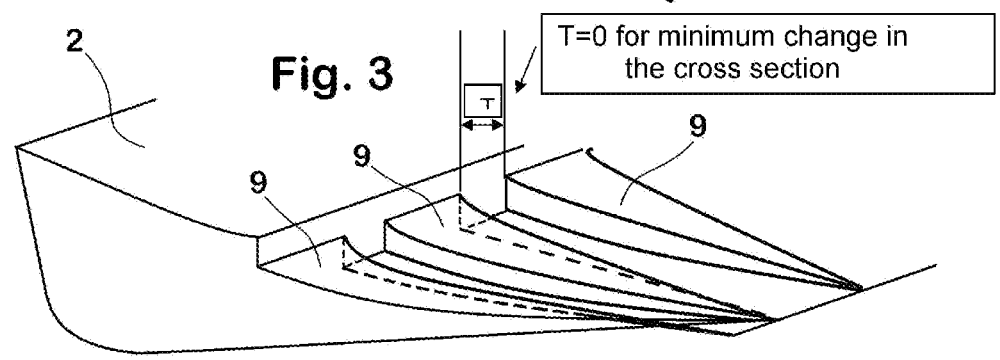
FIG. 3 is a diagrammatic perspective view of a second embodiment of the undertray trim panel having the FESAD air inlet shown in FIG. 1.

As an alternative to the air guiding plates 8, a plurality of small NACA air inlets 9 can be integrated into the air inlet 2 of undertray trim panel, as illustrated in FIG. 3, according to another embodiment.

Both the air guiding plates 8 and the integrated small NACA air inlets 9 are structures which do not change the overall flow cross section, according to one embodiment. This may apply, however, only to relatively small NACA air inlets, in which the distance T illustrated in FIG. 3 equals 0, which is to be aimed for because they are manufactured from thin metal plate or a like material, but produce eddies and lengthen the overall flow path somewhat which the air which flows through has to take. The eddy formation makes it possible to make the arcuate shape of the flat element 3 steeper and therefore to reduce the overall length of the NACA air inlet 2. It has been shown, moreover, that, in the case of a substantially constant overall flow cross section, the eddy production improves the overall throughput and therefore the cooling of the components in the region 1.

The motor vehicle undertray trim panel provides an improved NACA air inlet, what is known as a "flat efficient submerged air intake device" (FESAD) air inlet which runs less obliquely than a NACA duct and has a lower overall height. In accordance with the disclosed embodiment, the rear end of the upper flat element is adjoined by a planar air ram plate which extends by a small amount substantially vertically upward and then ends substantially freely in the engine compartment. The air ram plate which bends away vertically from the upper flat element deflects the air which tends to be warmer and is allowed to pass through the fan of the front radiator between the oil sump and the upper flat element away from the cooler air flow through the air inlet, with the result that the cooler air flow is not disrupted as a result. It has been shown that the flow separation effect of a relatively short planar air ram plate which bends away from the upper flat element and then ends freely in the engine compartment is at least practically just as satisfactory as if the upper flat element were led further in an arc which would have to be substantially longer and therefore would take up more space in the engine compartment in the vertical direction, in order that air flow also passes reliably onto the abovementioned components which are to be cooled satisfactorily.

Therefore, the undertray trim panel according to one embodiment can be of relatively flat design overall or at least partially, particularly below the components in the installation space, such as an internal combustion engine in the engine compartment of the vehicle. As a result, the engine and the entire drive train can be arranged lower in the vehicle with a constant ground clearance, as is desired for many motor vehicles.

Moreover, the FESAD air inlet according to one embodiment contains a plurality of eddy producing structures which do not change the overall flow cross section because they are manufactured from thin metal sheet or a like material, but produce intensive eddies and lengthen the overall flow path somewhat which the air that flows through has to take. The eddy formation makes it possible to make the arcuate shape, in particular of the upper flat element, particularly steep and therefore to reduce the overall length of the FESAD air inlet in the horizontal direction. In this way, the available packaging space in the engine compartment is increased both in the vertical direction and in the horizontal direction.

In accordance with one embodiment, the eddy producing structures are either a plurality of air guiding plates which extend in each case along the vehicle vertical axis and the vehicle longitudinal direction in the FESAD air inlet and which are curved transversely with respect thereto in such a way that the overall flow cross section in the vehicle longitudinal direction is substantially constant, or they are a plurality of small FESAD air inlets which are integrated into the FESAD air inlet.

Although air guiding structures are generally known from U.S. Pat. No. 4,455,045, such conventional structures are intended to avoid air flow separations on the outer side of a vehicle and to improve its aerodynamics. Moreover, the air guiding structures which are disclosed therein generally have wing-like cross sections, with the result that they reduce the effective flow cross section and therefore the throughput.

In one embodiment, the upper flat element runs of the undertray trim panel, starting from a front end which lies, for example, in the vehicle longitudinal direction in front of an internal combustion engine of the motor vehicle and below a front radiator, first of all approximately horizontally and at a spacing of, for example, a few centimeters below an oil sump of the internal combustion engine and then in a continuously steeper arc to its rear end which lies behind the oil sump and is adjoined by the air ram plate.

In one embodiment, the lower flat element runs, from a front end which lies in the vehicle longitudinal direction behind the rear end of the upper flat element, in a substantially steeper arc than the upper flat element rearward and upward to a rear end which lies even further rearward and substantially higher, for example by from approximately 10 to 25 centimeters, than the rear end of the upper flat element.

In one embodiment, the front end of the lower flat element lies below the lowest point of the upper flat element by a given height difference of preferably a few centimeters, which lowest point is usually situated at the front end of the upper flat element.

The planar air ram plate preferably extends by a height for a few centimeters substantially vertically upward as far as its free end, a few centimeters being understood here to mean a range from approximately 2 to 10 centimeters, according to one embodiment.

In one embodiment, at least the upper flat element is wider from the front toward the rear in relation to the vehicle transverse direction.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A motor vehicle undertray trim panel having an air inlet which is delimited toward a vehicle engine compartment and toward a roadway by way of an upper and a lower flat element, respectively, which flat elements extend arcuately rearward and upward in a direction of a vehicle engine compartment space, wherein a rear end of the upper flat element is adjoined by a planar air ram plate which is directed substantially vertically upward and ends substantially freely in the engine compartment, and wherein the air inlet contains eddy producing structures, the eddy producing structures either being a plurality of air guiding plates which extend along a vehicle vertical axis and a vehicle longitudinal direction in the air inlet and which are curved transversely such that an overall flow cross section in the vehicle longitudinal direction is substantially constant, or being a plurality of small air inlets which are integrated into the air inlet, wherein the lower flat element is rearward of the upper flat element and extends in a steeper curve than the upper flat element.

2. The undertray trim panel as claimed in claim 1, wherein the upper flat element extends from a front end which lies in the vehicle longitudinal direction in front of an internal combustion engine of the motor vehicle and below a front radiator, approximately horizontally and at a spacing below an oil sump of the internal combustion engine and then in a continuously steeper curve to a rear end which lies behind the oil sump and is adjoined by the air ram plate.

3. The undertray trim panel as claimed in claim 1, wherein the lower flat element extends, from a front end which lies in the vehicle longitudinal direction behind the rear end of the upper flat element, in the steeper curve than the upper flat element rearward and upward to a rear end which lies even further rearward and substantially higher than a rear end of the upper flat element.

4. The undertray trim panel as claimed in claim 1, wherein a front end of the lower flat element lies below the lowest point of the upper flat element or below the front end by a given height difference.

5. The undertray trim panel as claimed in claim 4, wherein the height difference is up to a few centimeters.

6. The undertray trim panel as claimed in claim 1, wherein the planar air ram plate extends in a substantially vertically upwardly directed manner a few centimeters as far as a free end.

7. The undertray trim panel as claimed in claim 1, wherein at least the upper flat element becomes wider from the front toward the rear.

8. A motor vehicle undertray trim panel comprising:
   an air inlet having upper and lower flat elements directed toward an engine compartment and a roadway and extending arcuately rearward and upward towards the engine compartment;
   a planar air ram plate adjoining a rear end of the upper flat element and directed substantially vertically upward, ending substantially freely in the engine compartment; and
   eddy producing structures contained in the air inlet, wherein the lower flat element is rearward of the upper flat element and extends in a steeper curve than the upper flat element.

9. The undertray trim panel as claimed in claim 8, wherein the eddy producing structures comprise a plurality of air guiding plates which extend along a vehicle vertical axis and a vehicle longitudinal direction in the air inlet and which are curved transversely such that an overall flow cross section in the vehicle longitudinal direction is substantially constant.

10. The undertray panel as claimed in claim 8, wherein the eddy producing structures comprise a plurality of small air inlets which are integrated into the air inlet.

11. The undertray trim panel as claimed in claim 8, wherein the upper flat element extends from a front end which lies in a vehicle longitudinal direction in front of an internal combustion engine of the motor vehicle and below a front radiator, approximately horizontally and at a spacing below an oil sump of the internal combustion engine and then in a continuously steeper curve to a rear end which lies behind the oil sump and is adjoined by the air ram plate.

12. The undertray trim panel as claimed in claim 8, wherein the lower flat element extends, from a front end which lies in a vehicle longitudinal direction behind the rear end of the upper flat element, in the steeper curve than the upper flat element rearward and upward to a rear end which lies even further rearward and substantially higher than a rear end of the upper flat element.

13. The undertray trim panel as claimed in claim 8, wherein a front end of the lower flat element lies below a lowest point of the upper flat element or below a front end by a given height difference.

14. The undertray trim panel as claimed in claim 13, wherein the height difference is up to a few centimeters.

15. The undertray trim panel as claimed in claim 8, wherein the planar air ram plate extends in a substantially vertically upwardly directed manner a few centimeters as far as a free end.

16. The undertray trim panel as claimed in claim 8, wherein at least the upper flat element becomes wider from the front toward the rear.

\* \* \* \* \*